(12) United States Patent
Wu et al.

(10) Patent No.: US 11,086,320 B2
(45) Date of Patent: Aug. 10, 2021

(54) WIRELESS COMMUNICATIONS BETWEEN VEHICLES

(71) Applicant: QUALCOMM Incorporated, San Diego, CA (US)

(72) Inventors: Zhibin Wu, Sunnyvale, CA (US); Shailesh Patil, San Diego, CA (US); Michaela Vanderveen, Tracy, CA (US); Sudhir Kumar Baghel, Hillsborough, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 16/291,592

(22) Filed: Mar. 4, 2019

(65) Prior Publication Data

US 2019/0361440 A1 Nov. 28, 2019

Related U.S. Application Data

(60) Provisional application No. 62/675,297, filed on May 23, 2018.

(51) Int. Cl.
*G05D 1/00* (2006.01)
*H04W 4/46* (2018.01)
(Continued)

(52) U.S. Cl.
CPC ......... *G05D 1/0088* (2013.01); *G05D 1/0276* (2013.01); *G05D 1/0289* (2013.01);
(Continued)

(58) Field of Classification Search
CPC ...................................................... H04W 4/46
See application file for complete search history.

(56) References Cited

U.S. PATENT DOCUMENTS

2010/0099353 A1 4/2010 Komori
2014/0327532 A1 11/2014 Park
(Continued)

OTHER PUBLICATIONS

Liu Jiang, Cai Gai-gen, Wang Yun-Peng, Wang Jian. "Location-based Cooperative Vehicle Collision Avoidance for Unsignalized Intersections: A Multi-sensor Integration Approach"; 2012 International Conference on Connected Vehicles and Expo, pp. 246-251 (Year: 2012).*

(Continued)

*Primary Examiner* — Peter D Nolan
*Assistant Examiner* — Tanya C Sienko
(74) *Attorney, Agent, or Firm* — Patterson & Sheridan, LLP

(57) ABSTRACT

Certain aspects of the present disclosure provide techniques relating to wireless communications between vehicles. In certain aspects, a method performed by a first vehicle comprises receiving an indication from a second vehicle comprising surrounding information that is indicative of whether a first unknown vehicle is detected by the second vehicle, wherein the first vehicle and the second vehicle are able to communicate wirelessly, and wherein the first unknown vehicle is unable to communicate wirelessly with the first and the second vehicles. The method further comprises controlling movement of the first vehicle based on the indication.

30 Claims, 13 Drawing Sheets

(51) Int. Cl.
   *G05D 1/02* (2020.01)
   *H04W 84/00* (2009.01)
   *H04W 16/32* (2009.01)

(52) U.S. Cl.
   CPC ...... *H04W 4/46* (2018.02); *G05D 2201/0213* (2013.01); *H04W 16/32* (2013.01); *H04W 84/005* (2013.01)

(56) References Cited

U.S. PATENT DOCUMENTS

| | | | |
|---|---|---|---|
| 2015/0274173 A1 | 10/2015 | Ando | |
| 2017/0154531 A1* | 6/2017 | Funabashi | G01C 21/30 |
| 2017/0243485 A1* | 8/2017 | Rubin | H04W 4/026 |

OTHER PUBLICATIONS

International Search Report and Written Opinion—PCT/US2019/025209—ISA/EPO—dated Jul. 4, 2019.

* cited by examiner

1100

1102

RECEIVE AN INDICATION FROM A SECOND VEHICLE COMPRISING SURROUNDING INFORMATION THAT IS INDICATIVE OF WHETHER A FIRST UNKNOWN VEHICLE IS DETECTED BY THE SECOND VEHICLE, WHEREIN THE FIRST VEHICLE AND THE SECOND VEHICLE ARE ABLE TO COMMUNICATE WIRELESSLY, AND WHEREIN THE FIRST UNKNOWN VEHICLE IS UNABLE TO COMMUNICATE WIRELESSLY WITH THE FIRST AND THE SECOND VEHICLES

1104

CONTROL MOVEMENT OF THE FIRST VEHICLE BASED ON THE INDICATION

FIG. 11

WIRELESS COMMUNICATIONS BETWEEN VEHICLES

CROSS-REFERENCE TO RELATED APPLICATIONS

This application claims the benefit of and priority to U.S. Application Ser. No. 62/675,297 entitled "WIRELESS COMMUNICATIONS BETWEEN VEHICLES," which was filed May 23, 2018. The aforementioned application is herein incorporated by reference in its entirety.

FIELD OF THE DISCLOSURE

Aspects of the present disclosure relate to wireless communications, and more particularly, to techniques relating to wireless communications between vehicles.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation. However, as the demand for mobile broadband access continues to increase, there exists a need for further improvements in NR and LTE technology. Preferably, these improvements should be applicable to other multi-access technologies and the telecommunication standards that employ these technologies.

Such technologies have been applied to enable wireless communication services in vehicles (e.g., wagons, bicycles, motor vehicles (motorcycles, cars, trucks, buses), railed vehicles (trains, trams), watercraft (ships, boats), aircraft, spacecraft, etc.). In fact, a "connected vehicle" is already a mainstream reality. In some cases vehicles can communicate with each other, which is commonly referred to as vehicle to vehicle (V2V) communications. In such cases, V2V communications may involve sharing of sensor information (such as camera, radar, or other sensor information) between vehicles which may help promote safety or enhance traffic flow. The potentially high number of vehicles involved in V2V and the high mobility of such vehicles presents challenges.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication performed by a first vehicle. The method generally includes receiving an indication from a second vehicle comprising surrounding information that is indicative of whether a first unknown vehicle is detected by the second vehicle, wherein the first vehicle and the second vehicle are able to communicate wirelessly, and wherein the first unknown vehicle is unable to communicate wirelessly with the first and the second vehicles. The method further includes controlling movement of the first vehicle based on the indication.

Certain aspects provide first vehicle, comprising a non-transitory memory comprising executable instructions and a processor in data communication with the memory and configured to execute the instructions to cause the first vehicle to receive an indication from a second vehicle comprising surrounding information that is indicative of whether a first unknown vehicle is detected by the second vehicle, wherein the first vehicle and the second vehicle are able to communicate wirelessly, and wherein the first unknown vehicle is unable to communicate wirelessly with the first and the second vehicles, and control movement of the first vehicle based on the indication.

Certain aspects provide a first vehicle comprising means for receiving an indication from a second vehicle comprising surrounding information that is indicative of whether a first unknown vehicle is detected by the second vehicle, wherein the first vehicle and the second vehicle are able to communicate wirelessly, and wherein the first unknown vehicle is unable to communicate wirelessly with the first and the second vehicles, and means for controlling movement of the first vehicle based on the indication.

Certain aspects provide a non-transitory computer readable medium having instructions stored thereon that, when executed by a first vehicle, cause the first vehicle to perform a method comprising receiving an indication from a second vehicle comprising surrounding information that is indicative of whether a first unknown vehicle is detected by the second vehicle, wherein the first vehicle and the second vehicle are able to communicate wirelessly, and wherein the first unknown vehicle is unable to communicate wirelessly with the first and the second vehicles, and controlling movement of the first vehicle based on the indication.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 11 illustrates example operations for wireless communications performed by a vehicle, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
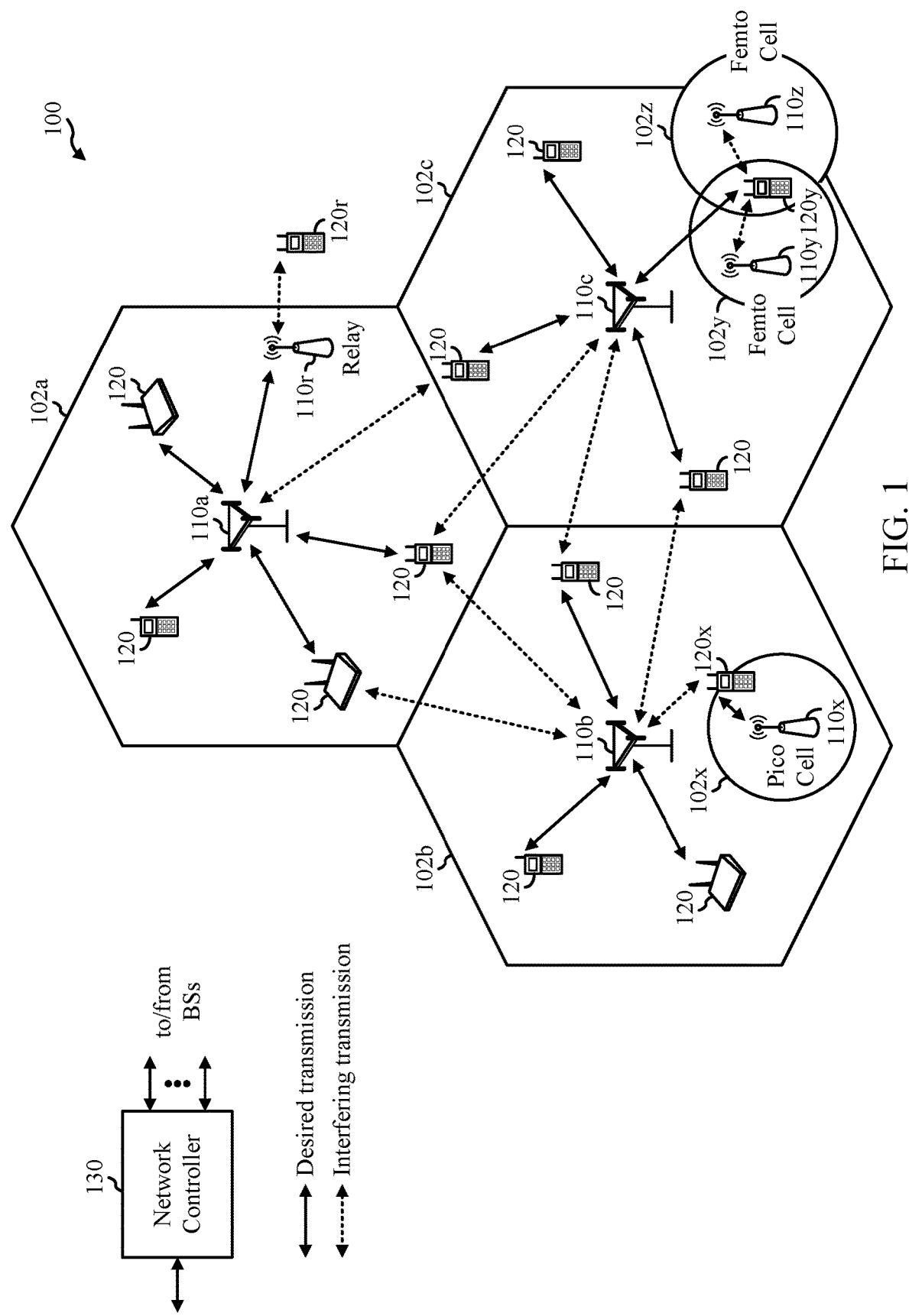
FIG. 1 is a block diagram conceptually illustrating an example telecommunications system, in accordance with certain aspects of the present disclosure.

Aspects of the present disclosure provide apparatus, methods, processing systems, and computer readable mediums relating to wireless communications between vehicles. As further described below, wireless communication technologies have been applied to enable wireless communication services in vehicles. For example, a type of wireless communication, referred to as vehicle-to-everything (V2X) communication, refers to the communication of information from a vehicle to any entity and vice versa. A V2X vehicle is able to share information about itself, such as its presence, location, direction, speed, etc. with other V2X vehicles. As V2X vehicles are still in their infancy stages, however, there are many vehicles that are not V2X-enabled (referred to as "non-V2X vehicles") and, therefore, are not able to communicate wirelessly with V2X vehicles. Therefore, a V2X vehicle may also be equipped with one or more sensors (e.g., radar, camera, light detection and ranging (LIDAR), etc.) to detect other vehicles (including non-V2X vehicles) in its vicinity.

However, in certain situations, a V2X vehicle may not detect a non-V2X vehicle in its vicinity. For example, in situations where a non-V2X vehicle is not within range of sensors of a V2X vehicle (e.g., it is too far, it is blocked by a structure, etc.), the V2X vehicle may not be able to detect the presence, speed, and/or location of the non-V2X vehicle. Accordingly, certain aspects described herein relate to enabling a V2X vehicle to adapt its driving based on surrounding information received about another vehicle (e.g., a non-V2X vehicle, a V2X vehicle unable to communicate temporarily, etc.) detected by one or more sensors of another V2X vehicle from the other V2X vehicle. For example, in certain aspects, a first V2X vehicle adapts its driving (e.g., speed, direction, etc.) based on surrounding information received from a second V2X vehicle, the surrounding information indicating whether another vehicle (e.g., a non-V2X vehicle) has been detected or not.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. Also, the components of UE 120 of FIG. 1 may perform operations 1100 of FIG. 11.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
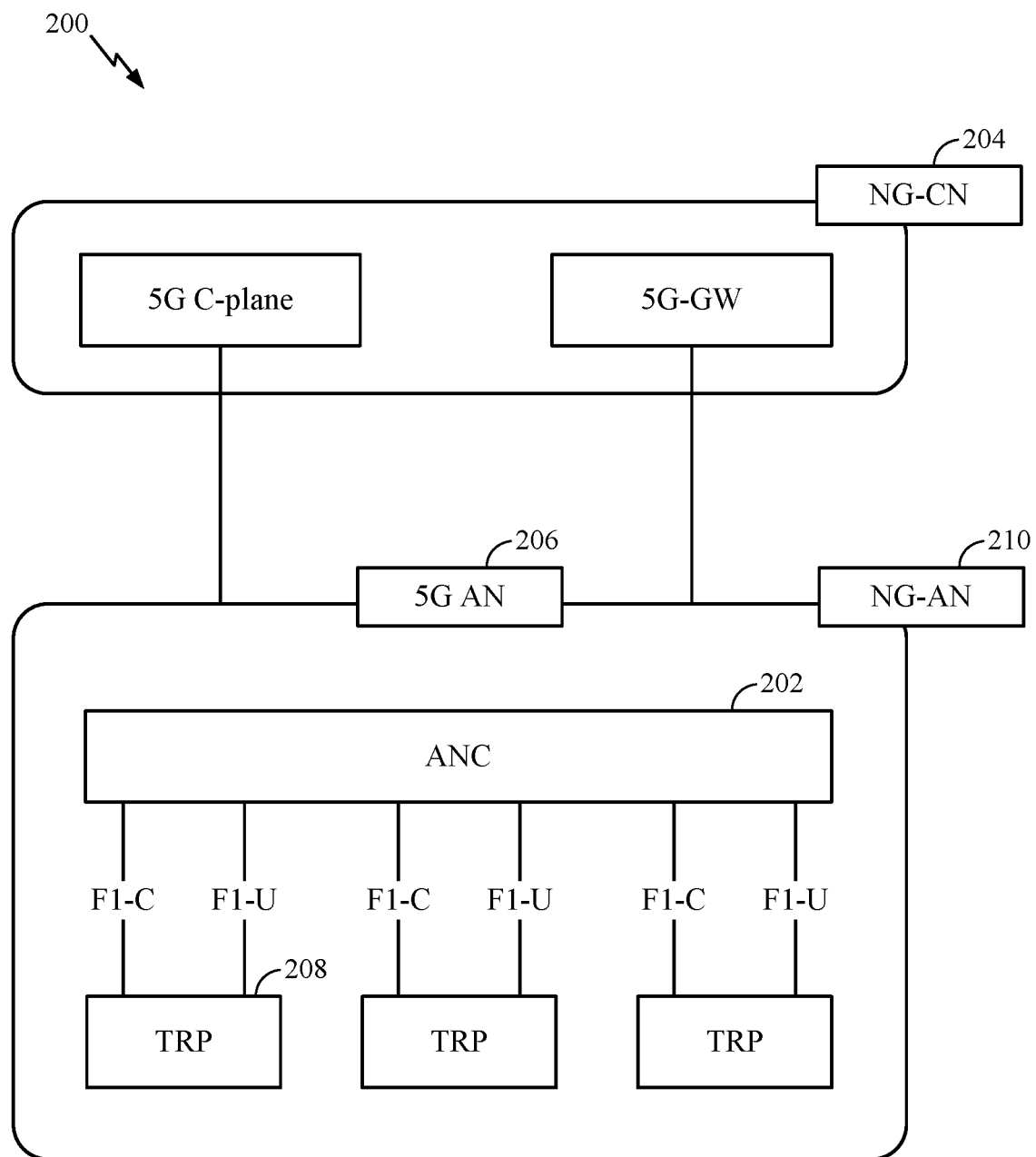
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
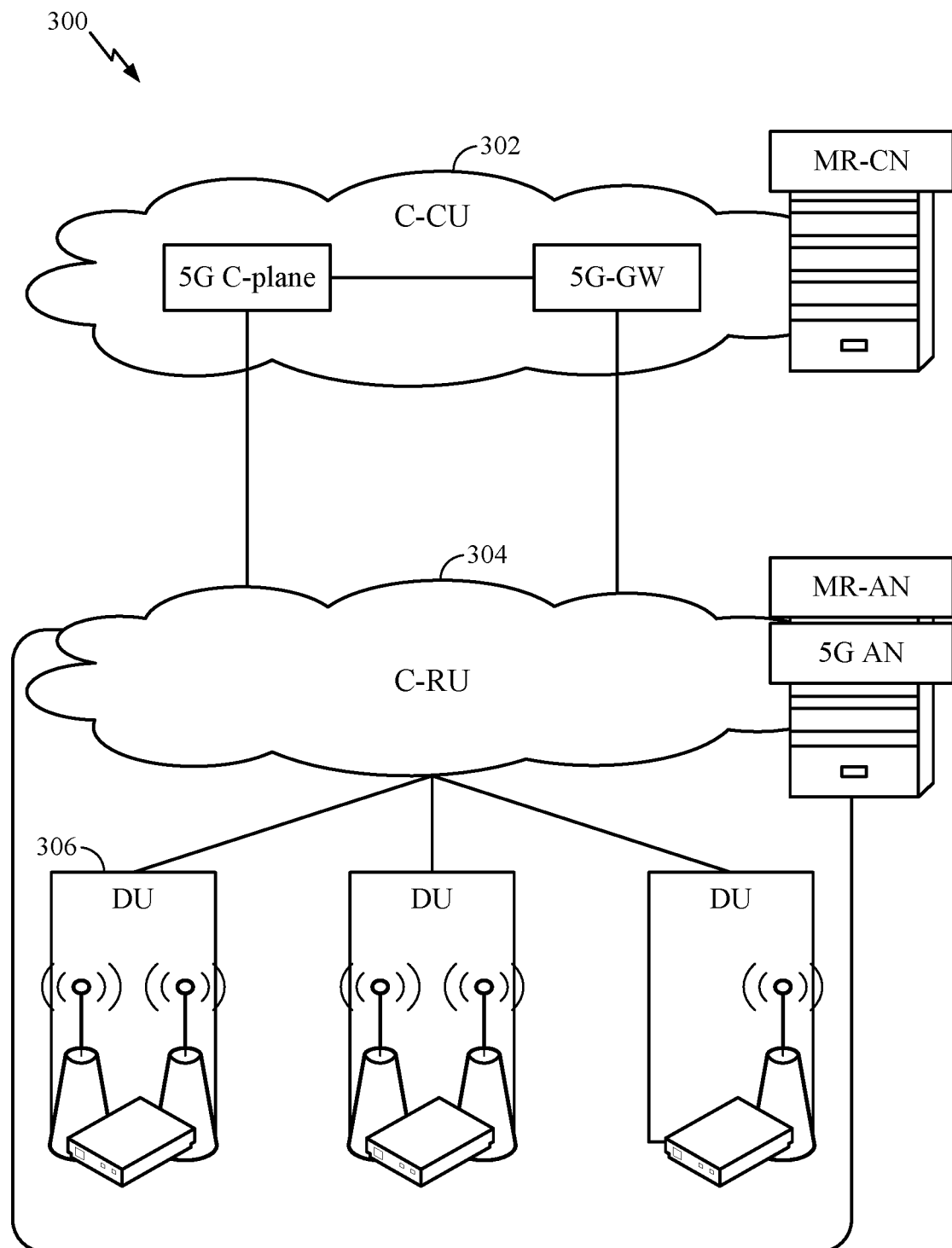
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
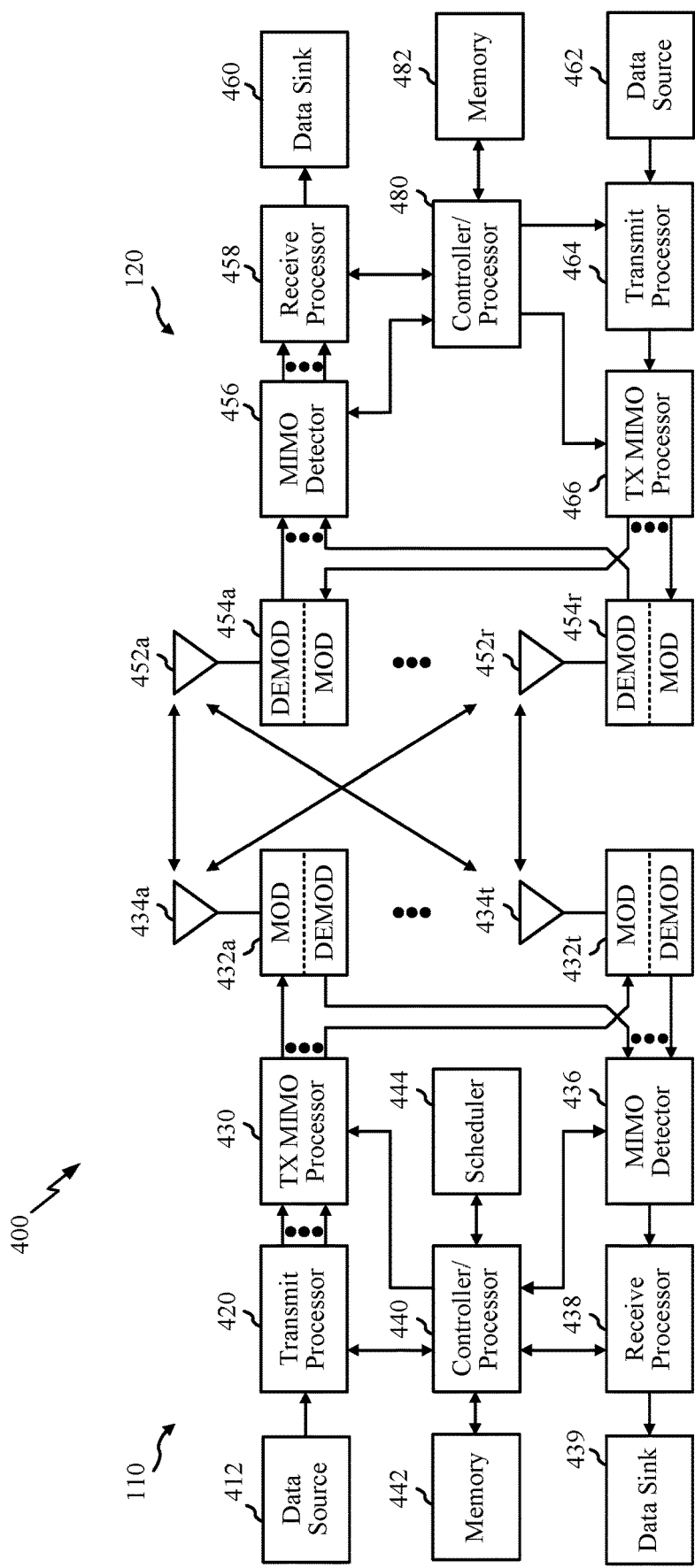
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to enable/perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. Also, the processor 480 and/or other processors and modules at the UE 120 may perform or direct the execution of processes for the techniques described herein (e.g., operations 1100 of FIG. 11). The memories 442 and 482 may store data and program codes for BS 110 and UE 120, respectively. A scheduler 444 may schedule UEs for data transmission on the downlink and/or uplink.

Figure 5:
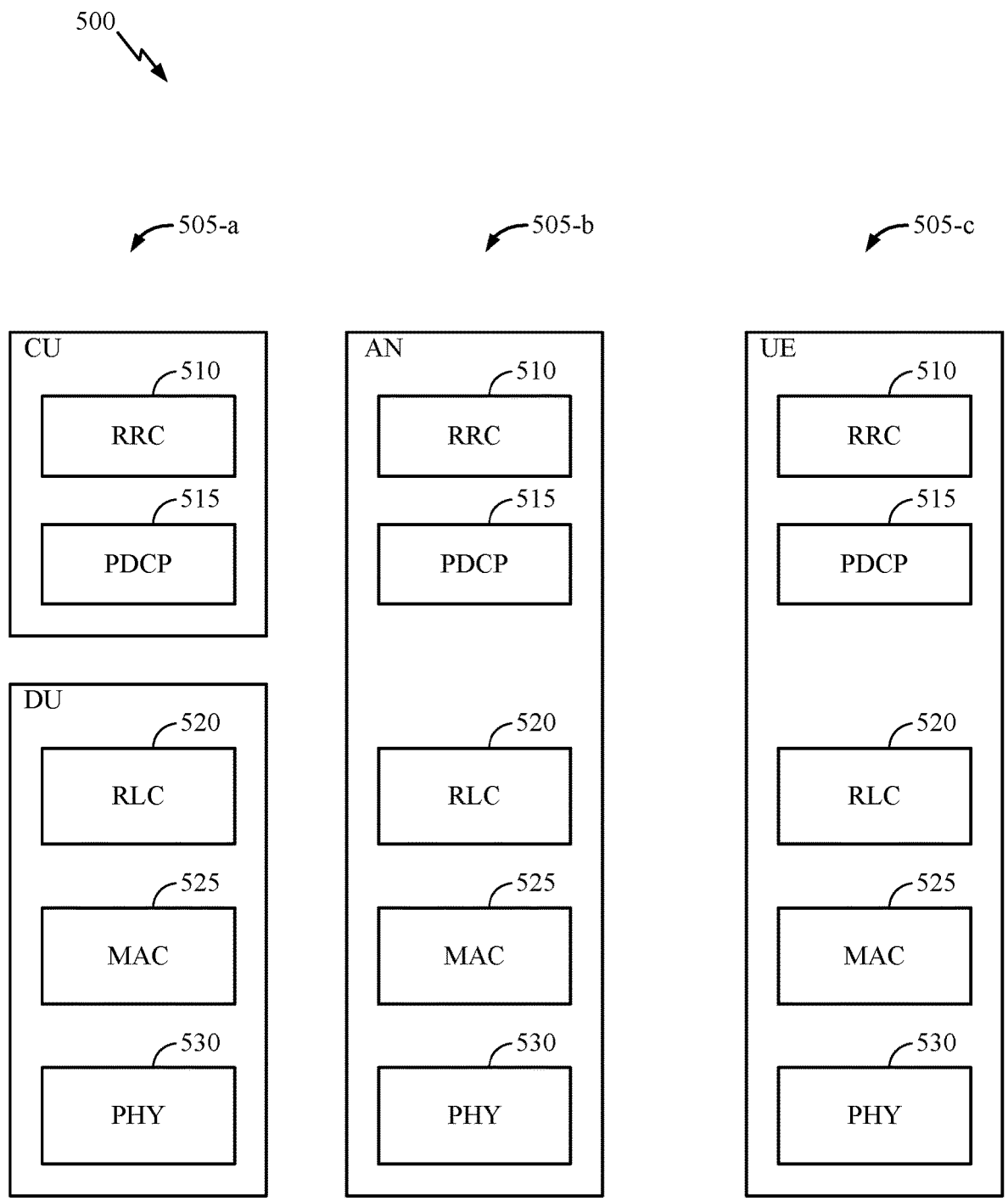
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
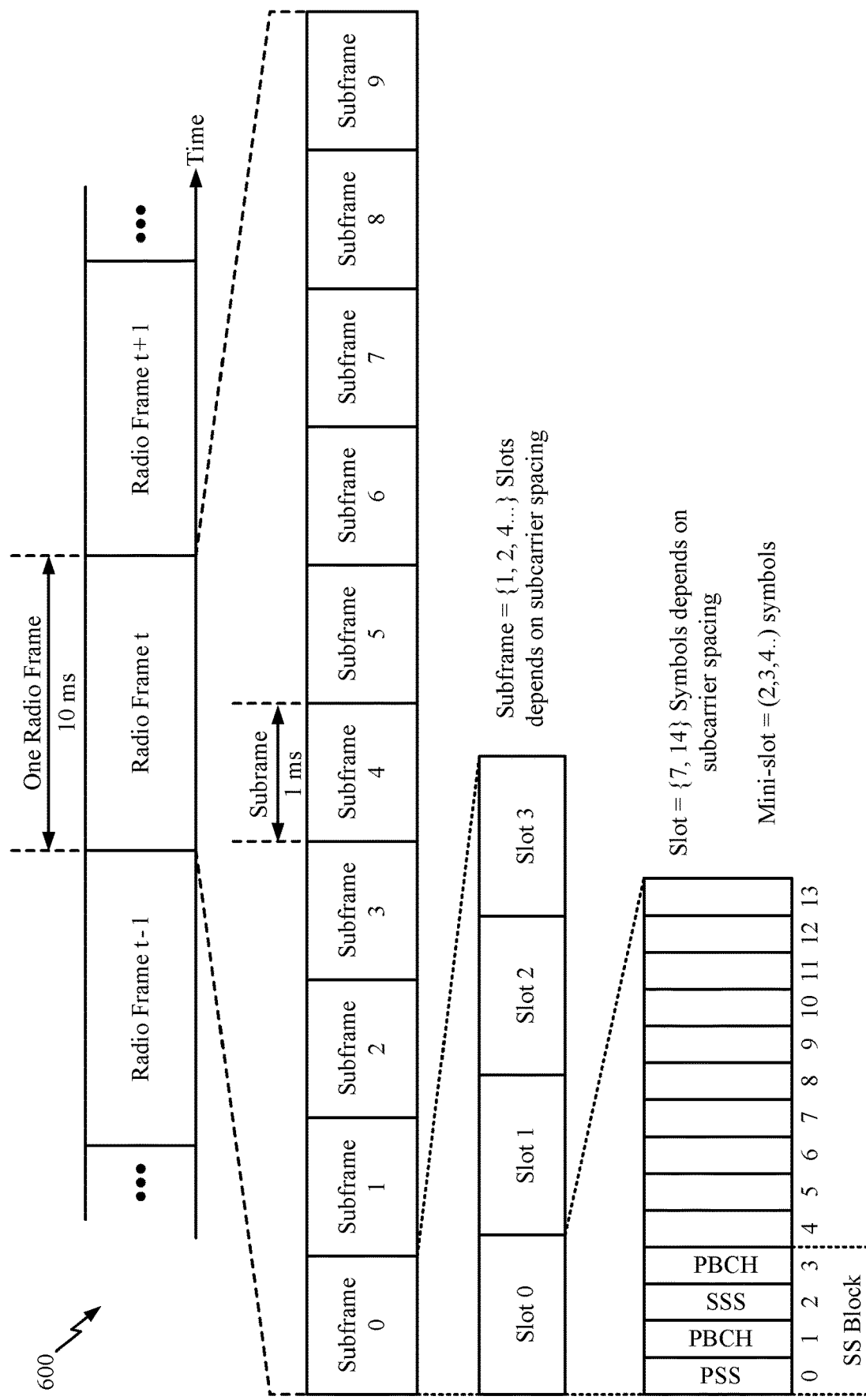
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example of Wireless Communications Between Vehicles

As discussed, wireless communication technologies have been applied to enable wireless communication services in vehicles. For example, a type of wireless communication, referred to as vehicle-to-everything (V2X) communication, refers to the communication of information from a vehicle to any entity and vice versa. V2X communication may comprise other more specific types of vehicular communication, such as vehicle-to-infrastructure (V2I), vehicle-to-vehicle (V2V), vehicle-to-pedestrian (V2P), vehicle-to-device (V2D), and vehicle-to-grid (vehicle-to-grid). Vehicles that support V2X communication may be referred to as V2X-enabled vehicles or V2X vehicles. A V2X vehicle is able to share information about itself, such as its presence, location, direction, speed, etc. with other V2X vehicles. Such communications between V2X vehicles increases safety and efficiency by allowing the V2X vehicles to coordinate and plan driving paths along roadways/streets. For example, V2X vehicles may be autonomous or semi-autonomous vehicles that use communications with other V2X vehicles to adapt how they drive/control movement of the V2X vehicle (e.g., accelerate, decelerate, brake, turn, etc.). As an example, a V2X vehicle that is approaching an intersection may communicate its location and speed to another V2X vehicle that is also approaching the intersection but traveling on a different cross street. This communication allows the V2X vehicles to coordinate such that both vehicles can safely pass the intersection, such as without stopping.

As V2X vehicles are still in their infancy stages, however, there are many vehicles that are not V2X-enabled (referred to as "non-V2X vehicles") and, therefore, are not able to communicate wirelessly with V2X vehicles. Therefore, V2X vehicles may not be able to coordinate with all other vehicles.

Accordingly, a V2X vehicle may also be equipped with one or more sensors (e.g., radar, camera, light detection and ranging (LIDAR), etc.) to detect other vehicles (including non-V2X vehicles) in the vicinity (e.g., range of 70 to 200 meters) of the V2X vehicle. The V2X vehicle may utilize the one or more sensors to determine surrounding information including a presence, speed, direction, and/or location of other vehicles, such as a non-V2X vehicle. The V2X vehicle may further utilize measurements from the one or more sensors to calculate surrounding information such as an estimated time of arrival (ETA) (e.g., time when the vehicle first reaches an intersection) or estimated time of passing (ETP) of a non-V2X vehicle. In some aspects, the ETP may refer to a time at which a vehicle first clears or passes the middle of an intersection while passing through the intersection. In some aspects, the ETP may refer to a time at which a vehicle first passes the entire intersection while passing through the intersection. In certain aspects, passing through an intersection may include making a left turn, a right turn, or going straight, for example, after entering the intersection or clearing the middle of the intersection.

In certain situations, a V2X vehicle may not detect a non-V2X vehicle in the vicinity of the V2X vehicle. For example, in situations where a non-V2X vehicle is not within range of sensors of a V2X vehicle (e.g., it is too far, it is blocked by a structure, etc.), the V2X vehicle may not be able to detect the presence, speed, and/or location of the non-V2X vehicle. Accordingly, the V2X vehicle may not be able to adapt to the non-V2X vehicle. For example, if the V2X vehicle is coming to an intersection, it may not, prior to arriving at the intersection, be able to determine if another non-V2X vehicle is within its path, and may stop at the intersection in order to avoid a potential collision with an undetected non-V2X vehicle. An example of such a situation is shown in FIG. 7.

Figure 7:
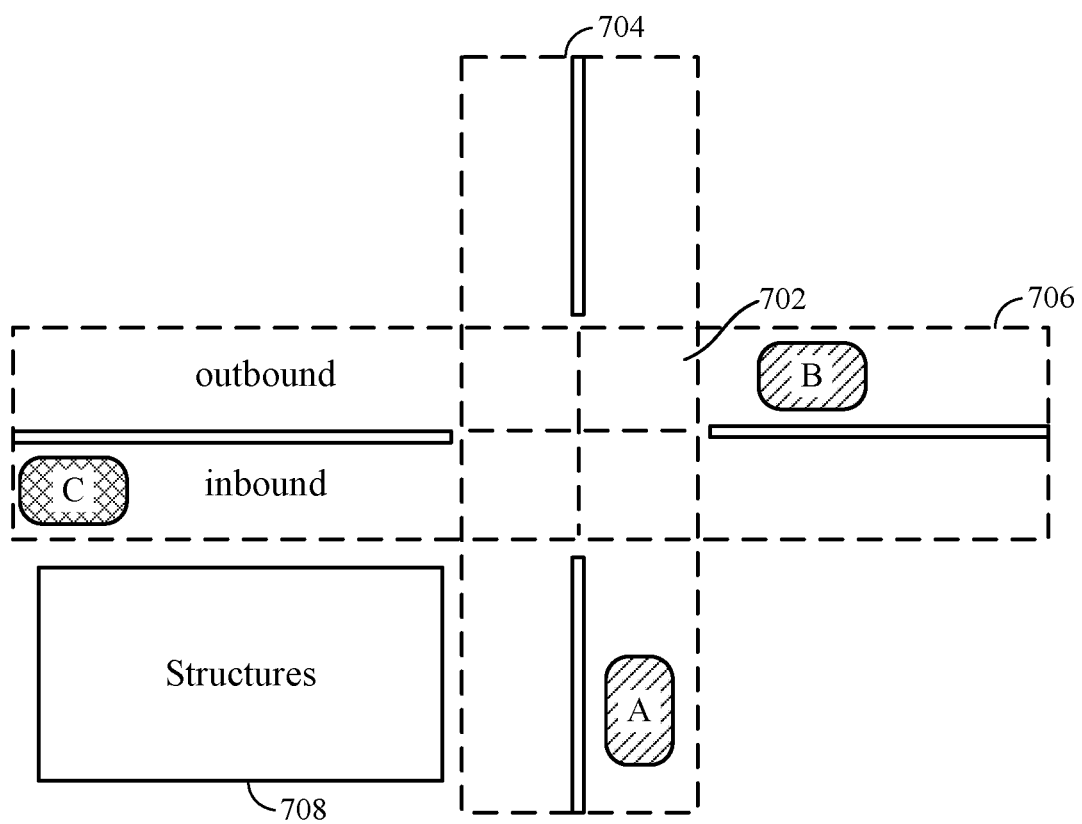
FIG. 7 illustrates two vehicle-to-everything (V2X) vehicles and one non-V2X vehicle approaching an intersection, in accordance with certain aspects of the present disclosure.

FIG. 7 illustrates an intersection 702 where streets 704 and 706 cross each other. FIG. 7 also shows V2X vehicles A and B as well as a non-V2X vehicle C. As discussed, V2X vehicles A and B may communicate their information with each other, such as to coordinate their ETA(s) at intersection 702 and/or ETP(s) of the intersection 702. Utilizing such information, V2X vehicles A and B may be able to adapt to one another such as to pass intersection 702 without stopping and without colliding with each other. In contrast to vehicle B, in the example of FIG. 7, vehicle C is a non-V2X vehicle and therefore vehicle A may not able to communicate with vehicle C to adapt to vehicle C.

As shown, vehicle C is approaching intersection 702 from street 706 while vehicle A is approaching intersection 702 from street 704. Even though vehicles A and C are not able to communicate, if vehicle A is able to detect vehicle C such as its location and speed, vehicle A may be able to estimate vehicle C's ETA and/or ETP at intersection 702. Accordingly, vehicle A can adapt its driving (e.g., adjust its own speed) so that the ETA and/or ETP of vehicle A allows vehicle A to pass intersection 702 without stopping. However, as discussed, vehicle C may not be detectable by vehicle A, in which case vehicle A cannot adapt to vehicle C. For example, as shown in FIG. 7, structures 708 may block vehicle A's sensors (e.g., line of sight (LOS)) and prevent them from detecting any vehicles (e.g., vehicle C) on the left side (orientation based on the figure shown) of street 706. In such an example, vehicle A may determine that it is safer to stop at intersection 702 to avoid a potential collision with a potential vehicle, such as vehicle C, that is traveling on street 706 and approaching intersection 702. Stopping at intersection 702 may, however, be inefficient for vehicle A because it causes a delay in vehicle A's trip.

Accordingly, certain aspects described herein relate to enabling a V2X vehicle (e.g., vehicle A) to adapt its driving based on surrounding information about another vehicle (e.g., vehicle C, a non-V2X vehicle, a V2X vehicle unable to communicate temporarily, etc.), where the surrounding information is received from and detected by one or more sensors of another V2X vehicle (e.g., vehicle B). Though certain aspects are described herein with respect to a first V2X vehicle receiving surrounding information about another vehicle (e.g., a non-V2X vehicle) detected by sensors of a second V2X vehicle and the first V2X vehicle adapting its driving based thereon, it should be noted such techniques may be applicable to the first V2X vehicle receiving surrounding information about any number of vehicles detected by sensors of any number of V2X vehicles and from any number of V2X vehicles and adapting its driving based thereon.

In the example of FIG. 7, vehicle C may be seen and/or detected by a V2X vehicle ahead of vehicle C (e.g., traveling on street 706 in front of vehicle C in the same direction), behind vehicle C (e.g., traveling on street 706 behind vehicle C in the same direction), approaching intersection 702 from the opposite direction (e.g., vehicle B), or approaching intersection 702 from the opposite direction as vehicle A. In such an example, a V2X vehicle that is in one of the above mentioned situations may be able to detect vehicle C using one or more sensors. The V2X vehicle may further determine vehicle C is an unknown vehicle (e.g., a non-V2X vehicle, a V2X vehicle unable to communicate temporarily, etc.), based on, for example, not receiving any communications from vehicle C (e.g., by searching communications records/logs stored at V2X vehicle for communication from vehicle C). The V2X vehicle may then communicate surrounding information about vehicle C to other V2X vehicles (e.g., vehicle A), so that the other V2X vehicles, which are not able to detect vehicle C, can receive surrounding information about vehicle C. For example, in FIG. 7, vehicle B is approaching intersection 702 from the opposite direction of vehicle C and is able to detect vehicle C. After detecting vehicle C, vehicle B determines vehicle C is an unknown vehicle and communicates surrounding information about vehicle C to other V2X vehicles (e.g., vehicle A).

In certain aspects, unknown vehicles generally have certain characteristics that help V2X vehicles designate such unknown vehicles as unknown. For example, an unknown vehicle may stop at an intersection before passing the intersection. In such an example, a V2X vehicle may detect a vehicle that is stopping at an intersection and search through its communications record to find a message or announcement from a vehicle indicating that the vehicle is stopping at the intersection. Upon finding no such message, the V2X vehicle may determine that the vehicle stopping at the intersection is an unknown vehicle.

In some aspects, a stopped unknown vehicle can be detected by all "head" V2X vehicles in every lane, meaning all V2X vehicles approaching an intersection without another vehicle in front of them before the intersection. In some aspects, an unknown vehicle that is stopped at an intersection is detected by all V2X vehicles in its vicinity, provided the V2X vehicles close to the intersection are equipped with one or more sensors that enable the V2X vehicles to detect non-V2X vehicles and monitor the intersection area. In some aspects, the speed of any vehicles (including unknown vehicles) passing an intersection may be determinable by other V2X vehicles in the vicinity. In addition, once a vehicle enters an intersection, other V2X vehicles may be able to calculate how long it takes for the vehicle to pass the intersection (e.g., ETP). The V2X vehicles may then share such surrounding information about other vehicles to other V2X vehicles to be used to adapt driving.

As described above, a V2X vehicle may periodically broadcast its information, such as location and speed, to other V2X vehicles. In addition, once a V2X vehicle detects an unknown vehicle, in some aspects, the V2X vehicle may broadcast certain surrounding information about the unknown vehicle. In some aspects, the surrounding information includes only an indication about the existence of the unknown vehicle in addition to its direction and/or lane of travel. In some aspects, the surrounding information may also include the unknown vehicle's location and speed, which may be determined based on measurements and/or estimations. In some aspects, the surrounding information includes additional information about the unknown vehicle, as discussed.

In the example of FIG. 7, vehicle B is a V2X vehicle that may periodically broadcast its information to vehicle A and vice versa. In some aspects, once vehicle B detects vehicle C and determines that it is an unknown vehicle, vehicle B may broadcast surrounding information about vehicle C, which may include vehicle C's existence, direction and/or lane or other information about vehicle C. In addition to vehicle C's existence, direction, and/or lane, in some aspects, vehicle B may also determine and broadcast vehicle C's location and speed as part of the surrounding information. In some aspects, vehicle B may be configured to periodically broadcast the surrounding information even after it has passed intersection 702 (e.g., even when it is in the outbound lane on street 706) for the benefit of other V2X vehicles even though vehicle C may no longer impact the driving adaptation of vehicle B. In some aspects, vehicle B may calculate the ETA/ETP of vehicle C itself and broadcast such information as surrounding information. In some aspects, other vehicles may calculate the ETA/ETP of vehicle C based on other surrounding information broadcast by vehicle B.

Based on the surrounding information received from vehicle B, vehicle A may adapt its driving. For example, vehicle A may determine whether it is possible to coordinate and adjust its ETA and ETP in order to ensure that vehicle A can pass intersection 702 without stopping. In some aspects, to make such a determination, vehicle A may take into account the surrounding information received relating to one or more unknown vehicles (e.g., vehicle C) as well as the ETA/ETP of all the V2X vehicles (e.g., vehicle B) approaching intersection 702.

For example, in FIG. 7, vehicle B may periodically broadcast its ETA/ETP to vehicle A. In some aspects, the ETA and ETP may be announced in absolute times. For example, vehicle B may broadcast it has a 1:00 pm ETA at intersection 702 and a 1:05 ETP. In other words, instead of indicating that vehicle B's ETA at intersection 702 in a certain number of seconds (e.g., 15 seconds), a certain absolute time may be used to indicate the ETA. Absolute times may be used to avoid any message transmission delay, which may cause vehicle A to determine an inaccurate ETA for vehicle B based on the number of seconds indicated in the message. For example, vehicles may be synchronized to the same time, such that absolute time is indicative of the ETA no matter when the message is transmitted and received.

Figure 8:
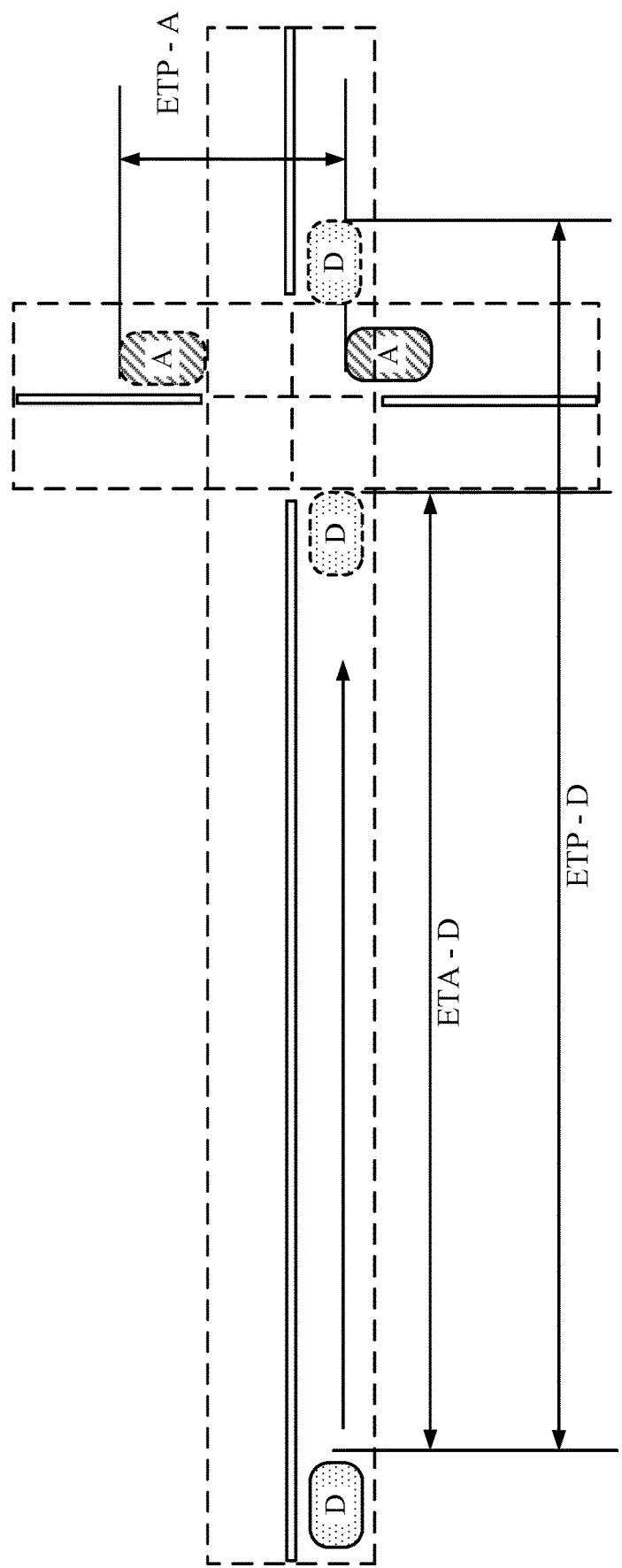
FIG. 8 illustrates two V2X vehicles and graphical representations of the V2X vehicles' estimated time of arrival (ETA) and estimated time of passing in relation to an intersection, in accordance with certain aspects of the present disclosure.

FIG. 8 illustrates a graphical representation of an ETA and ETP of vehicles A and D. As shown, vehicle D's ETA is the amount of time it takes for vehicle D to reach the intersection, without entering the intersection. As described above, in some aspects, the ETA may be announced in absolute time, in which case the ETA indicates the time when vehicle D reaches the intersection, without entering it. Vehicle D's ETP, on the other hand, is the amount of time it takes vehicle D to exit the intersection. In absolute time, in some aspects, vehicle D's ETP may indicate a time when vehicle D exits the intersection (e.g., the earliest time at which vehicle D has exited the intersection). In other aspects, vehicle D's ETP may indicate the earliest time at which vehicle D passes the middle of the intersection. FIG. 8 also shows vehicle A's ETP, which indicates a time it takes vehicle A to exit the intersection from where it is shown to be on the map. In absolute time, in some aspects, vehicle A's ETP may indicate the earliest time at which vehicle A has exited the intersection. In other aspects, vehicle D's ETP may indicate the earliest time at which vehicle A passes the middle of the intersection.

In some aspects, to determine the earliest possible timing for entering the intersection, a vehicle may use another vehicle's ETP that refers to a time when the other vehicle passes the middle of the intersection. For example, in FIG. 8, vehicle D may use vehicle A's ETP to determine an appropriate time for entering the intersection. In such an example, vehicle D may use an ETP of vehicle A that refers to when vehicle A first passes the entire intersection (e.g., ETP-A shown in FIG. 8). However, this ETP may not enable vehicle D to determine the earliest possible timing for entering the intersection, as vehicle D may potentially enter the intersection once vehicle A passes the middle of the intersection. Accordingly, to determine the earliest possible timing for entering the intersection, vehicle D may use an ETP of vehicle A that refers to when vehicle A first passes the middle of the intersection.

In some aspects, each vehicle that is approaching an intersection may be allowed to adjust its ETA/ETP until the vehicle is declared. A declaration refers to an announcement or a broadcast by a V2X vehicle that certifies the ETA/ETP of the vehicle. Once a vehicle certifies its ETA/ETP, in some aspects, it may no longer alter them. In some aspects, a V2X vehicle may track "anchor" vehicles that are approaching the intersection from other lanes. From the perspective of a V2X vehicle approaching an intersection, an anchor vehicle refers to a vehicle whose ETA is earlier or shorter than the ETA of the V2X vehicle. In addition, an anchor vehicle may be the closest to the intersection in comparison to all the other vehicles in the same lane. The V2X vehicle may declare its ETA/ETP only after all the anchor vehicles have declared their ETA/ETP. At each intersection, a V2X vehicle may identify one or more anchor vehicles, as described with respect to FIG. 9.

Figure 9:
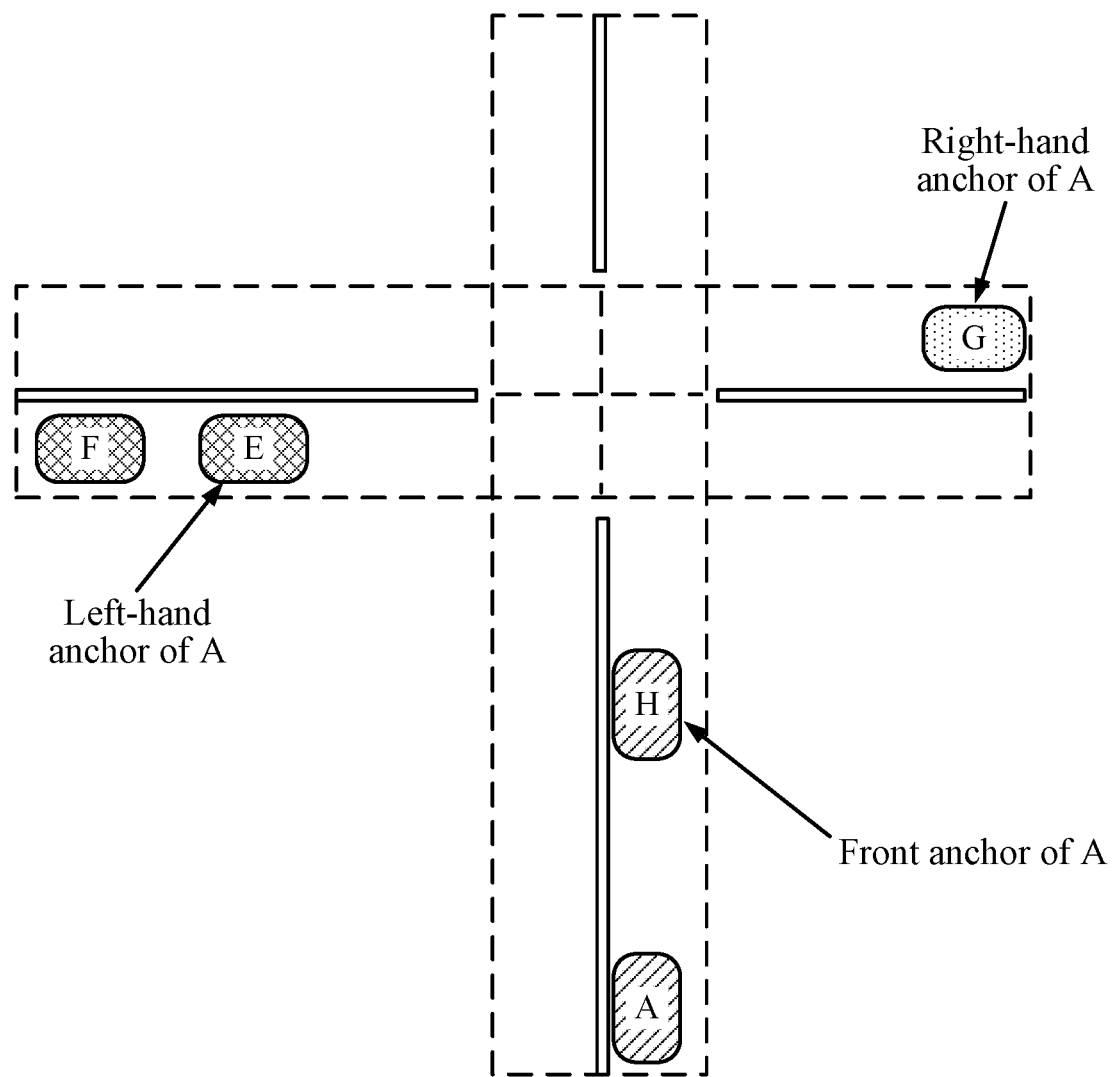
FIG. 9 illustrates a V2X vehicle and a number of anchor V2X vehicles, in accordance with certain aspects of the present disclosure.

FIG. 9 illustrates a number of anchor vehicles from the perspective of vehicle A. In FIG. 9, vehicles H, E, G, and F may be V2X vehicles. For example, vehicle H is a front anchor of vehicle A because vehicle H's ETA is earlier than the ETA of vehicle A with respect to the intersection and vehicle H is traveling in front of vehicle A. In addition, vehicle A may identify vehicle E as its left-hand anchor because the ETA of vehicle E is earlier than the ETA of vehicle A and vehicle E is approaching from the left hand side of vehicle A. Vehicle A may also determine that the ETA of vehicle F is later than vehicle A's ETA so it is not an anchor. In other words, vehicle A can pass the intersection after vehicle E but ahead of vehicle F. Vehicle A may also identify vehicle G as its right-hand anchor because the ETA of vehicle G is earlier than the ETA of vehicle A and vehicle G is approaching from the right hand side of vehicle A.

In some aspects, after anchor vehicles H, G, and E declare their ETAs/ETPs, vehicle A is able to determine its own ETA/ETP by taking into account all anchor vehicles and their trajectories. For example, based on vehicle H's ETA and identifying vehicle H as an anchor, vehicle A may adjust its ETA such that there is at least a minimal time gap between the ETA of vehicle H and the ETA of vehicle A. This allows other anchor vehicles to pass the intersection after vehicle H but before vehicle A. In some aspects, how long this time gap is depends on vehicle A's assessment of the number of vehicles that may pass after vehicle H but before vehicle A. For example, the time gap may be long enough to allow vehicles E and G to pass in between vehicles A and H. In such an example, vehicle A may adapt its driving so the ETA of vehicle A is at least later than the ETP of vehicles E and G.

In some aspects, one or more of the anchor vehicles H, G, and E may not declare themselves, in which case vehicle A may default to stopping at the intersection instead of adjusting its ETA such that it can pass the intersection without stopping.

As described above, in some scenarios, in addition to V2X vehicles approaching an intersection, there may be one or more unknown vehicles approaching the intersection as well. As a result, in addition to information about the ETA/ETP of the V2X vehicles approaching the intersection (e.g., including anchor V2X vehicles), a V2X vehicle may determine its ETA/ETP based on surrounding information received from one or more of those V2X vehicles relating to the one or more unknown vehicles.

Figure 10:
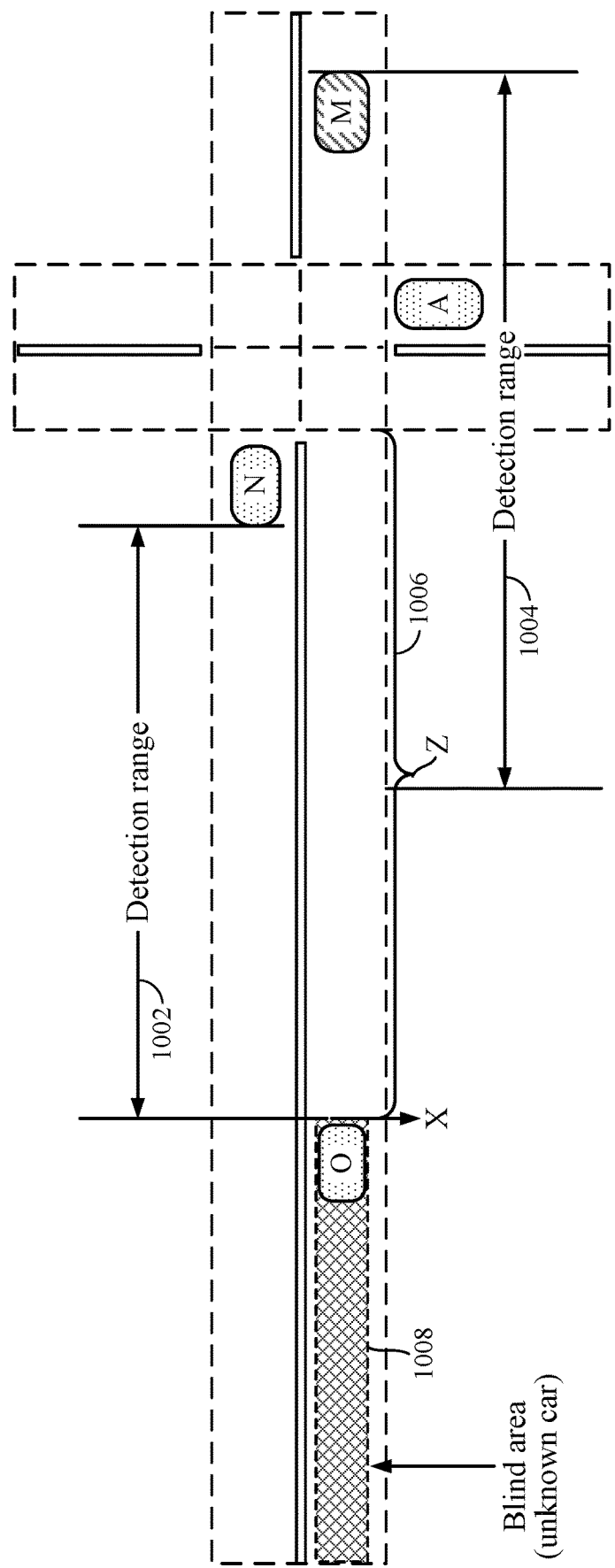
FIG. 10 illustrates a blind area of a V2X vehicle and detection ranges of a number of other V2X vehicles, in accordance with certain aspects of the present disclosure.

FIG. 10 illustrates V2X vehicles A, N, and M and non-V2X vehicle O. FIG. 10 shows detection range 1002 of vehicle N and detection range 1004 of vehicle M. Within detection range 1002, vehicle N is able to detect an unknown vehicle using one or more sensors as discussed. In certain aspects, a detection range is directional. In certain aspects, a detection range is non-directional and indicates the length of the radius within which a vehicle is able to detect unknown vehicles. In other words, although FIG. 10 shows a detection range 1002 on the left side of vehicle N (e.g., in front of it), vehicle N may be able to detect vehicles on its right side (e.g., behind it) within the same detection range as well. FIG. 10 also illustrates detection range 1004 of vehicle M.

Because vehicle A may not be able to detect or observe an unknown vehicle approaching the intersection from the left inbound lane 1006, vehicles N and M may be configured to broadcast surrounding information to vehicle A, which may include an indication about whether an unknown vehicle can be detected within their detection range. However, if an area is not covered by the detection range of any V2X vehicles and is also not detectable by vehicle A, the area is a blind area of vehicle A. An example of such an area is shown in FIG. 10 as blind area 1008. Blind area 1008 of vehicle A refers to an area that vehicle A is not able to detect and is not within the detection range of any other V2X vehicles communicating with vehicle A, such as vehicle N and B. As a result, if an unknown vehicle, such as vehicle O, is in blind area 1008, it may not be detected by vehicles N and M. Vehicle A would, therefore, not be notified about vehicle O.

In the inbound or outbound lanes of a certain direction, there may be one or multiple potential blind areas, from vehicle A's perspective. This is because the surrounding information provided by other V2X vehicles as well as sensory information provided by vehicle A itself may not be able to cover the inbound and outbound lanes continuously. In some aspects, a vehicle's sensor detection range may vary (e.g., camera view blocked by a vehicle or another entity such as traffic signs) in the same or opposite driving direction. In some aspects, vehicle A may utilize certain techniques to determine the validity of an initial determination that a certain area is a blind area. For example, any blind area shorter/smaller than the length of a normal vehicle may not contain an "unknown" vehicle. Therefore, such an area is actually not blind, but clear.

In some aspects, a blind area (e.g., blind area 1008) may grow with a maximum speed (e.g., maximum speed of an unknown vehicle, such as 25 m/s). For example, even if vehicle N, while travelling on the outbound lane, loses communication with vehicle A, blind area 1008 of vehicle A may not include the entire roadway on the left side up until the intersection. More specifically, prior to vehicle A losing communication with vehicle N, vehicle A may definitively assume that there are no unknown vehicles within detection range 1002 of vehicle N. This is because, if an unknown vehicle were traveling in detection range 1002, vehicle N would have notified vehicle A about it. When vehicle N eventually loses communication with vehicle A, vehicle A can assume that blind area 1008 may expand toward the intersection at a maximum speed. This is because, even assuming an unknown vehicle, such as vehicle O, is right outside of the detection range of vehicle N when vehicle N loses communication with vehicle A, vehicle O may only travel at the maximum speed towards the intersection. As a result, vehicle A may assume that there is a certain amount of time (t) left for vehicle A to pass the intersection until a potential unknown vehicle reaches the intersection. The amount of time (t), for example, equals the distance (e.g., distance Z) between where vehicle N's detection range ended (e.g., location X) when vehicle N lost communication with vehicle A and the intersection divided by the maximum speed.

In some aspects, blind area 1008 may be reduced based on a new V2X car with a detection range that overlaps with blind area 1008 communicating with vehicle A. For example, another V2X vehicle may take vehicle N's place after a few seconds, in which case, the V2X vehicle may detect any unknown vehicles in its detection range and notify vehicle A about it.

FIG. 11 illustrates example operations 1100 performed by a first vehicle traveling on a first path (e.g., street), according to aspects of the present disclosure.

Operations 1100 begin, at 1102, by receiving, at the first vehicle, an indication from a second vehicle comprising surrounding information that is indicative of whether a first unknown vehicle is detected by the second vehicle, wherein the first vehicle and the second vehicle are able to communicate wirelessly, and wherein the first unknown vehicle is unable to communicate wirelessly with the first and the second vehicles. In certain aspects, the first vehicle and the second vehicle are V2X vehicles while the first unknown vehicle is a non-V2X vehicle. In certain aspects, the surrounding information indicates whether the first unknown vehicle is detected by the second vehicle within a detection range of the second vehicle.

In some aspects, the indication may also include information about the second vehicle itself, such as the location, direction, lane, and speed of the second vehicle itself. In some aspects, the indication itself may include the second vehicle's ETA/ETP.

At 1104, the first vehicle controls movement of the first vehicle based on the indication.

Example of Second Vehicle not Indicating Existence of an Unknown Vehicle

As described, in some aspects, the surrounding information received from the second vehicle may only indicate whether an unknown vehicle is detected by the second vehicle or not. If the surrounding information indicates that no unknown vehicle is detected by the second vehicle, in some aspects, the first vehicle may consider the detection range of the second vehicle and determine an ETA of a hypothetical unknown vehicle in a blind area of the first vehicle (e.g., area that is not visible to the first vehicle and is outside the detection range of the second vehicle) at the intersection.

Figure 12:
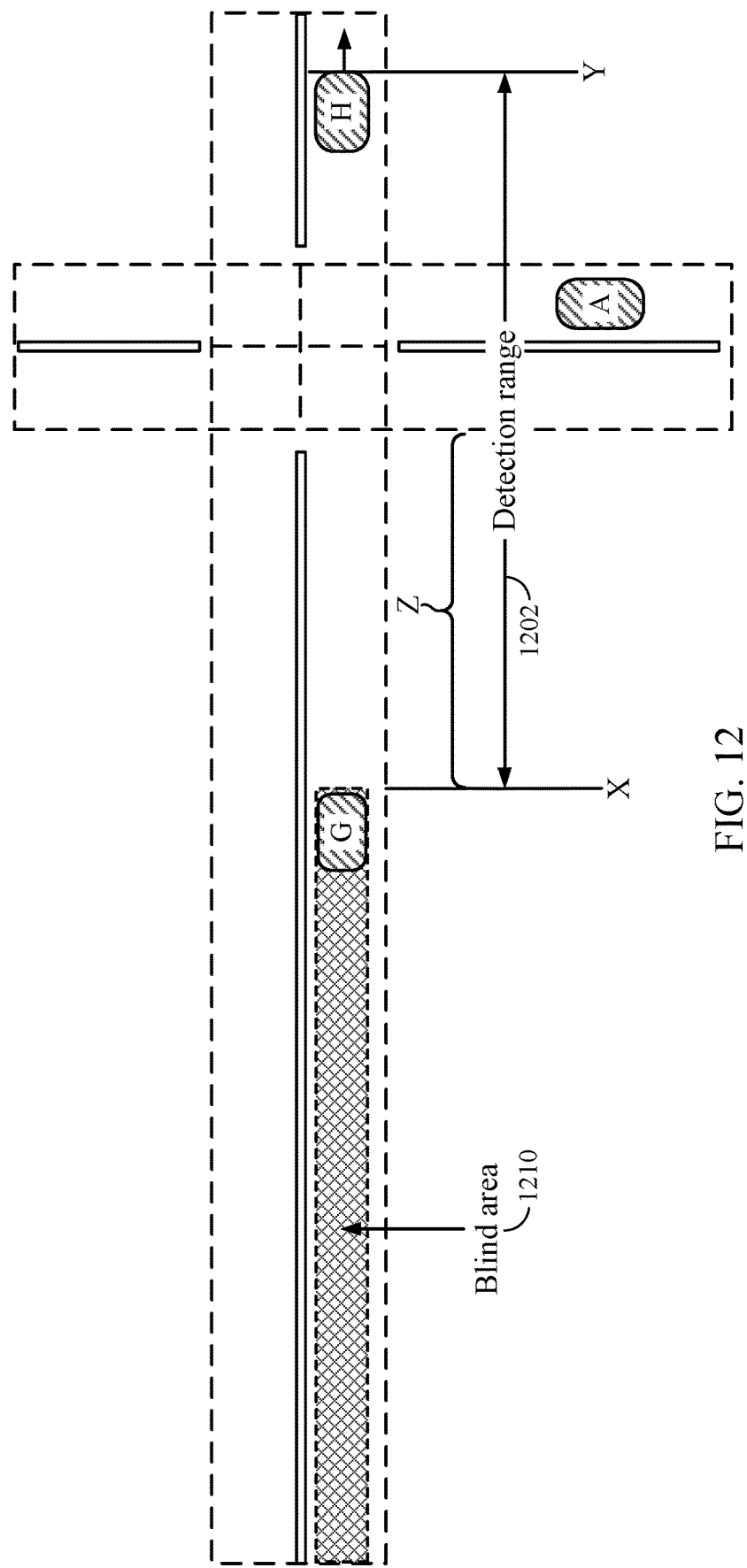
FIG. 12 illustrates a blind area of a V2X vehicle and detection ranges of another V2X vehicle, in accordance with certain aspects of the present disclosure.

An example of this is shown in FIG. 12, where vehicles A and H are V2X vehicles and vehicle G is a non-V2X vehicle. As shown, vehicle H (e.g., second vehicle) may transmit surrounding information to vehicle A (e.g., first vehicle) indicating that there is no unknown vehicle (e.g., first unknown vehicle) detected within the detection range 1202 of vehicle H. However, as vehicle H drives away from the intersection, blind area 1210 of vehicle A expands towards the intersection. In addition, at some point in time, vehicle H may lose communication with vehicle A, in which case vehicles A and H may no longer be able to communicate. For example, after reaching location Y, vehicle H may lose communication with vehicle A. In such an example, the last indication received by vehicle A includes surrounding information indicating that there are no unknown vehicles within detection range 1202 of vehicle H, which covers an area up to location X. However, although the surrounding information does not indicate the existence of an unknown vehicle within detection range 1202, it may still not be safe for vehicle A to pass the intersection without stopping because a vehicle, such as vehicle G (e.g., first unknown vehicle), may be right outside of vehicle H's detection range 1202 and approaching the intersection.

Accordingly, based on the surrounding information, vehicle A may be configured to calculate when a hypothetical unknown vehicle, such as vehicle G, may reach the intersection. For example, vehicle A may assume that there is an unknown vehicle (e.g., vehicle G) at approximately location X, and calculate a time t corresponding to the length of time it may take for the unknown vehicle to reach the intersection, in the worst case scenario. For example, vehicle A may assume that an unknown vehicle may travel at a certain maximum speed (e.g., 25 m/s) and calculate t by dividing distance Z (distance between location X and the intersection) by the maximum speed. Time t may correspond to a hypothetical unknown vehicle's ETA at the intersection. In addition to an ETA, vehicle A may also calculate an ETP for the unknown vehicle. In certain aspects, when calculating the ETA and ETP of the hypothetical unknown vehicle, an assumption that the hypothetical unknown vehicle will stop at the intersection may also be taken into account.

In some aspects, the first vehicle may calculate its trajectory, at least in part, based on the ETA of a hypothetical unknown vehicle. For example, based on the calculation described above, if the first vehicle determines that its ETA/ETP may potentially overlap with the ETA/ETP of the hypothetical unknown vehicle, the first vehicle may determine to stop at the intersection. In addition to considering the ETA of a hypothetical unknown vehicle, the first vehicle may also calculate its trajectory based on the ETA of any other vehicle approaching the intersection.

For example, in the case of FIG. 7, a second vehicle (e.g., vehicle B) is itself approaching the intersection. In such an example, the second vehicle may declare its ETA and ETP to a first vehicle (e.g., vehicle A) in relation to the intersection. Accordingly, the first vehicle may coordinate its trajectory not only based on the ETA of a hypothetical unknown vehicle but also the ETA/ETP of the second vehicle as well as ETA/ETP of any other vehicles approaching the intersection and communicating with the first vehicle. In other words, the first vehicle may not need to stop at the intersection as long as it can coordinate its ETA/ETP with the ETA of a hypothetical unknown vehicle, the ETA/ETP of the second vehicle, and the ETA(s)/ETP(s) of one or more other vehicles (e.g., V2X vehicles) approaching the intersection, if any.

In some aspects, if the second vehicle is approaching the intersection, the first vehicle may arrange its ETA to be within a short time threshold of (e.g., immediately after) the second vehicle's ETP. For example, the first vehicle may arrange its ETA to be within less than a few seconds (e.g., less than 1 or 2 seconds) of the second vehicle's ETP.

More specifically, the first vehicle may first determine the second vehicle's declared ETA/ETP in relation to the intersection based on an indication transmitted by the second vehicle. The first vehicle may then compare its own ETA with the second vehicle's ETA. Subsequently, the first vehicle may determine that the second vehicle is an anchor vehicle based on determining that the second vehicle's ETA is less than or earlier than the first vehicle's ETA. After determining that the second vehicle is an anchor, the first vehicle may then arrange its ETA to be immediately after the ETP of the second vehicle.

Keeping a very close distance with the second vehicle is advantageous for the first vehicle because it results in the first vehicle and the second vehicle remaining in each other's communication range for a longer period of time, which increases safety by helping ensure that the first vehicle is notified by the second vehicle if an unknown vehicle is detected by the second vehicle. In addition, maintaining a close distance with the second vehicle increases the likelihood of the first vehicle passing the intersection without a stop. This is because if the first and the second vehicles are very far from each other and an unknown vehicle enters the detection range of the second vehicle, the first vehicle has less time to pass the intersection without stopping than if the first vehicle and the second vehicle are very close to each other.

In some aspects, if the first vehicle detects an unknown vehicle (e.g., second unknown vehicle) that is traveling behind the first vehicle, the first vehicle may reduce its own speed to allow the second vehicle to pass the intersection without stopping, before the first vehicle passes the intersection. This is because the second vehicle may not be able to detect the second unknown vehicle traveling behind the first vehicle. As a result, if the first vehicle passes the intersection quickly, the second vehicle may be forced to stop at the intersection because it is not able to determine whether there is an unknown vehicle in its blind area or not.

Example of Second Vehicle Indicating Existence of an Unknown Vehicle

In some situations, the surrounding information received from the second vehicle indicates the existence of an unknown vehicle. In the example of FIG. 7, vehicle B may send surrounding information to vehicle A indicating the existence of vehicle C that is traveling in an inbound lane towards intersection 702. If the surrounding information received from vehicle B only indicates the existence of vehicle C, vehicle A may determine to stop. This is because if vehicle A is not aware of vehicle C's location and speed, vehicle A is not able to determine when vehicle C may reach intersection 702. As a result, vehicle A may determine to stop at intersection 702 to avoid a potential collision.

In some aspects, after initially determining to stop, vehicle A may determine that it is safe to pass the intersection without stopping. For example, after initially determining to stop, vehicle A may observe vehicle C passing the intersection, in which case, vehicle A may determine that the collision threat has disappeared. As a result, vehicle A may reevaluate its determination to stop at the intersection. For example, having determined that vehicle C has passed the intersection, if vehicle A is not notified about any other unknown vehicles, it may pass the intersection without stopping, provided that vehicle A coordinates its ETA/ETP with other vehicles (e.g., vehicle B and others). When vehicle A determinates not to pass the intersection, it may declare the determination to other vehicles.

In addition, in some aspects, after initially determining to stop, vehicle A's blind area may shrink as it approaches the intersection, and eventually be eliminated because of vehicle A's proximity to the intersection. In such aspects, vehicle A may itself be able to determine if there are any unknown vehicles approaching the intersection. In that case, if vehicle A does not detect any unknown vehicles, vehicle A may proceed to pass the intersection without stopping, provided that vehicle A coordinates its ETA/ETP with other vehicles (e.g., vehicle B and others). When vehicle A determinates not to pass the intersection is, it may declare the determination to other vehicles.

In some aspects, instead of only indicating the existence of vehicle C, the surrounding information may also indicate the location and speed of vehicle C. In such aspects, vehicle A may use the location and speed of vehicle C to determine vehicle C's ETA and ETP, based on which vehicle A may control its own movement. In other aspects, the surrounding information itself may indicate vehicle C's ETA and ETP. Vehicle A may determine whether to stop at intersection 702 based on the ETA/ETP of vehicle C as well as the ETA/ETP of vehicle B, assuming vehicle B has declared its ETA/ETP. If, considering the ETA/ETP of vehicle C and vehicle B, vehicle A is not able to adapt its driving to pass the intersection without stopping, then vehicle A may determine to stop. For example, if vehicle C's ETA and ETP are earlier than vehicle A's ETA and ETP, vehicle A may determine to stop because vehicle A may not be able to determine how long vehicle C may stop at the intersection once it reaches the intersection. Accordingly, it may be unsafe for vehicle A in this situation to declare its ETA/ETP and pass the intersection without stopping.

As described above, vehicle A may later determine that it is safe to pass the intersection without stopping if the threat of collision with vehicle C is eliminated (e.g., because vehicle A observes vehicle C pass the intersection) or if vehicle A's blind area disappears and vehicle A observes no collision threats.

If, based on the ETA/ETP of vehicle C, vehicle A determines that it can safely pass the intersection without stopping, vehicle A may declare this determination, provided vehicle A does not have to stop based on the declared ETA/ETP of vehicle B or other vehicles.

As described above, in some aspects, the first vehicle (e.g., vehicle A) may arrange its ETA to be within a short time threshold of (e.g., immediately after) the second vehicle's (e.g., vehicle B) ETP. This is advantageous for the first vehicle in situations where an unknown vehicle is detected by the second vehicle. Also as described above, in some aspects, if the first vehicle detects an unknown vehicle that is traveling behind the first vehicle, the first vehicle may reduce its own speed to allow the second vehicle to pass the intersection without stopping before the first vehicle passes the intersection.

In some aspects, the first vehicle may receive indications, from one or more other vehicle, including the second vehicle, which may indicate a combination of the scenarios above. For example, the second vehicle may indicate that an unknown vehicle is not detected within its detection range while another vehicle may indicate that an unknown vehicle is detected within its detection range. In such aspects, the first vehicle may control its movement by performing a combination of the one or more aspects described above.

Figure 13:
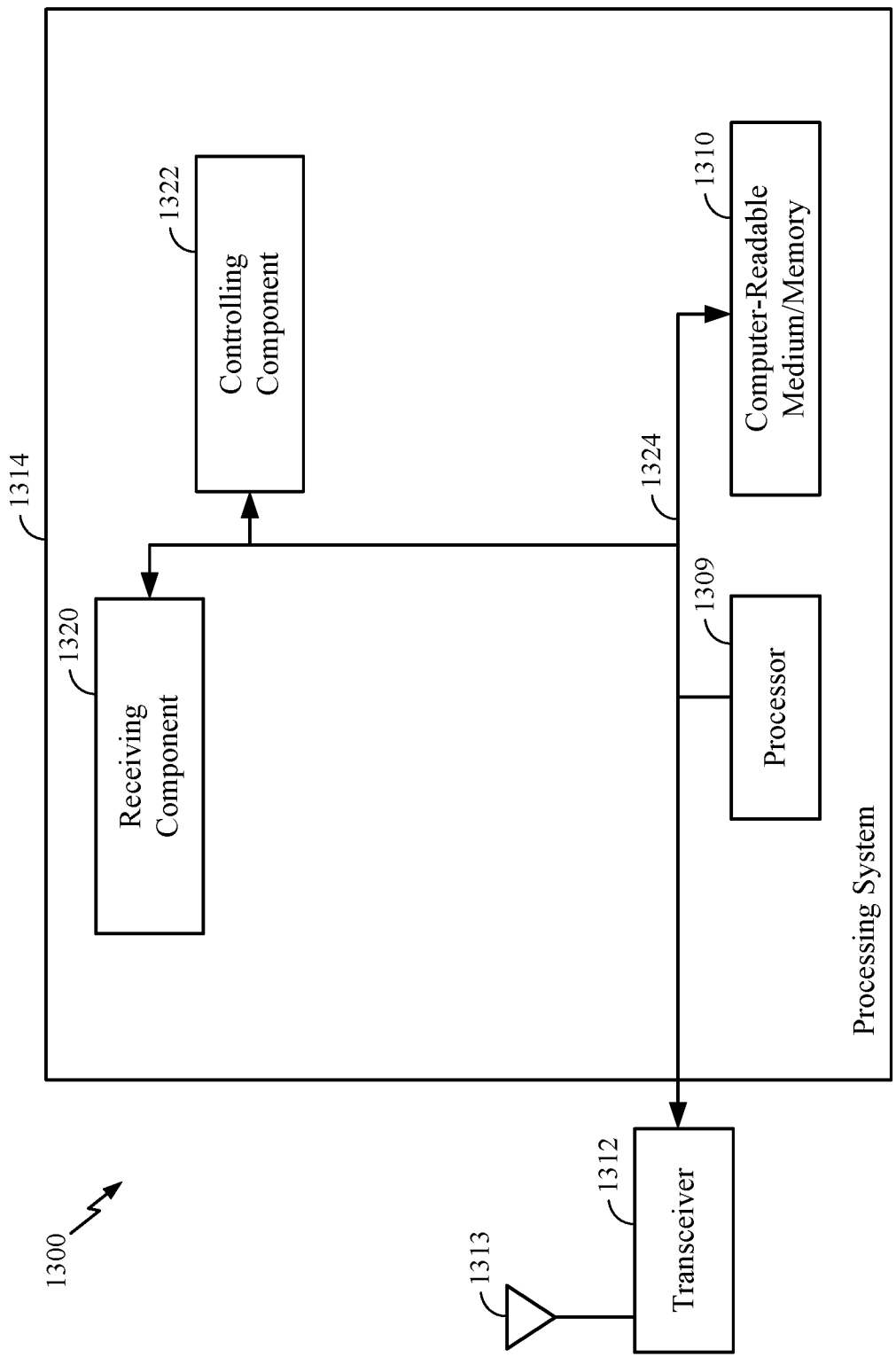
FIG. 13 illustrates a communications device that may include various components configured to perform operations for the techniques disclosed herein, such as one or more of the operations illustrated in FIG. 11.

FIG. 13 illustrates a wireless communications device 1300 (i.e., first vehicle) that may include various components (e.g., corresponding to means-plus-function components) configured to perform operations for the techniques disclosed herein, such as one or more of the operations illustrated in FIG. 11. The communications device 1300 includes a processing system 1314 coupled to a transceiver 1312. The transceiver 1312 is configured to transmit and receive signals for the communications device 1300 via an antenna 1313. The processing system 1314 may be configured to perform processing functions for the communications device 1300, such as processing signals, etc.

The processing system 1314 includes a processor 1309 coupled to a computer-readable medium/memory 1310 via a bus 1324. In certain aspects, the computer-readable medium/memory 1310 is configured to store instructions that when executed by processor 1309, cause the processor 1309 to perform one or more of the operations illustrated in FIG. 11, or other operations for performing the various techniques discussed herein.

In certain aspects, the processing system 1314 further includes a receiving component 1320 for performing one or more of the operations illustrated at 1102 in FIG. 11. Additionally, the processing system 1314 includes a controlling component 1322 for performing one or more of the operations illustrated at 1104 in FIG. 11.

The receiving component 1320 and the controlling component 1322 may be coupled to the processor 1309 via bus 1324. In certain aspects, the receiving component 1320 and the controlling component 1322 may be hardware circuits. In certain aspects, the receiving component 1320 and the controlling component 1322 may be software components that are executed and run on processor 1309.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications performed by a first vehicle, comprising:
   receiving an indication from a second vehicle comprising surrounding information indicating that a first unknown vehicle is detected within a detection range of the second vehicle, wherein the first vehicle and the second vehicle are able to communicate wirelessly, and wherein the first unknown vehicle is unable to communicate wirelessly with the first and the second vehicles, wherein:
      the first vehicle is traveling on a first street that crosses a second street at an intersection,
      the surrounding information further indicates a direction of the first unknown vehicle and a lane from which the first unknown vehicle is approaching the intersection, and
      one of:
         the surrounding information further comprises a location and a speed of the first unknown vehicle and the method further comprises calculating an estimated time of arrival (ETA) and an estimated time of passing (ETP) of the first unknown vehicle based on the location and the speed of the first unknown vehicle and the detection range of the second vehicle, or
         the surrounding information indicates the ETA and the ETP of the first unknown vehicle; and
   controlling movement of the first vehicle based on the indication.

2. The method of claim 1, further comprising:
   designating a blind area of the first vehicle that is not detected by the first vehicle and is also outside the detection range of the second vehicle.

3. The method of claim 2, further comprising:
   calculating an ETA of a hypothetical vehicle traveling in the blind area of the first vehicle towards the intersection based on the detection range of the second vehicle.

4. The method of claim 3, wherein controlling the movement of the first vehicle further comprises controlling the movement of the first vehicle based on the ETA of the hypothetical vehicle.

5. The method of claim 3, wherein the indication further comprises a declaration of an ETA of the second vehicle and an ETP of the second vehicle in relation to the intersection, and wherein controlling the movement of the first vehicle further comprises controlling the movement of the first vehicle based on the ETA of the hypothetical vehicle, the ETA of the second vehicle, and the ETP of the second vehicle.

6. The method of claim 1, wherein controlling the movement of the first vehicle further comprises determining whether to stop at the intersection based on the ETA of the first unknown vehicle and the ETP of the first unknown vehicle.

7. The method of claim 1, wherein controlling the movement of the first vehicle further comprises determining to stop at the intersection.

8. The method of claim 7, further comprising:
   after determining to stop at the intersection, reevaluating the determining to stop based on an event.

9. The method of claim 8, wherein the event includes the first vehicle detecting the first unknown vehicle passing the intersection.

10. The method of claim 8, wherein the event includes the first vehicle detecting the first unknown vehicle.

11. The method of claim 1, wherein the indication further comprises a declaration of an ETA of the second vehicle and an ETP of the second vehicle in relation to the intersection, the method further comprising:
- comparing an ETA of the first vehicle at the intersection with the ETA of the second vehicle at the intersection; and
- determining that the second vehicle is an anchor based on the ETA of the second vehicle being earlier than the ETA of the first vehicle.

12. The method of claim 11, wherein controlling the movement of the first vehicle further comprises adjusting, in response to determining the second vehicle is the anchor, a speed of the first vehicle to allow the first vehicle to pass the intersection without stopping within a threshold time after the second vehicle passes the intersection, wherein the adjusting is based on the ETA of the second vehicle, the ETP of the second vehicle and the surrounding information.

13. The method of claim 12, wherein the threshold time is measured from the ETP of the second vehicle in relation to the intersection.

14. The method of claim 11, wherein adjusting the speed of the first vehicle further comprises:
- detecting a second unknown vehicle behind the first vehicle, wherein the first vehicle is not able to communicate with the second unknown vehicle;
- reducing the speed of the first vehicle to allow the second vehicle to pass the intersection without stopping before the first vehicle passes the intersection without stopping and before the second unknown vehicle passes the intersection.

15. The method of claim 11, wherein the indication is received from the second vehicle before the second vehicle approaches the intersection.

16. The method of claim 15, further comprising:
- receiving a second indication after the second vehicle passes the intersection, the second indication comprising a second surrounding information that is indicative of whether the first unknown vehicle is detected by the second vehicle within the detection range of the second vehicle.

17. A first vehicle, comprising:
- a memory; and
- a processor coupled to the memory, the processor being configured to:
  - receive an indication from a second vehicle comprising surrounding information indicating that a first unknown vehicle is detected within a detection range of the second vehicle, wherein the first vehicle and the second vehicle are able to communicate wirelessly, and wherein the first unknown vehicle is unable to communicate wirelessly with the first and the second vehicles, wherein:
    - the first vehicle is traveling on a first street that crosses a second street at an intersection,
    - the surrounding information further indicates a direction of the first unknown vehicle and a lane from which the first unknown vehicle is approaching the intersection, and
    - one of:
      - the surrounding information further comprises a location and a speed of the first unknown vehicle and the processor is further configured to calculate an estimated time of arrival (ETA) and an estimated time of passing (ETP) of the first unknown vehicle based on the location and the speed of the first unknown vehicle and the detection range of the second vehicle, or
      - the surrounding information indicates the ETA and the ETP of the first unknown vehicle; and
  - control movement of the first vehicle based on the indication.

18. The first vehicle of claim 17, wherein the processor is further configured to:
- designate a blind area of the first vehicle that is not detected by the first vehicle and is also outside the detection range of the second vehicle.

19. The first vehicle of claim 18, wherein the processor is further configured to:
- calculate an ETA of a hypothetical vehicle traveling in the blind area of the first vehicle towards the intersection based on the detection range of the second vehicle.

20. The first vehicle of claim 19, wherein the processor being configured to control the movement of the first vehicle further comprises the processor being configured to control the movement of the first vehicle based on the ETA of the hypothetical vehicle.

21. The first vehicle of claim 19, wherein the indication further comprises a declaration of an ETA of the second vehicle and an ETP of the second vehicle in relation to the intersection, and wherein the processor being configured to control the movement of the first vehicle further comprises the processor being configured to control the movement of the first vehicle based on the ETA of the hypothetical vehicle, the ETA of the second vehicle, and the ETP of the second vehicle.

22. The first vehicle of claim 17, wherein the processor being configured to cause the first vehicle to control the movement of the first vehicle comprises the processor being configured to determine to stop at the intersection.

23. The first vehicle of claim 17, wherein the indication further comprises a declaration of an ETA of the second vehicle and an ETP of the second vehicle in relation to the intersection, wherein the processor is further configured to:
- compare an ETA of the first vehicle at the intersection with the ETA of the second vehicle at the intersection; and
- determine that the second vehicle is an anchor based on the ETA of the second vehicle being earlier than the ETA of the first vehicle.

24. The first vehicle of claim 23, wherein the processor being configured to control the movement of the first vehicle further comprises the processor being configured to adjust, in response to determining the second vehicle is the anchor, a speed of the first vehicle to allow the first vehicle to pass the intersection without stopping within a threshold time after the second vehicle passes the intersection, wherein the processor being configured to adjust is based on the ETA of the second vehicle, the ETP of the second vehicle, and the surrounding information.

25. The first vehicle of claim 24, wherein the threshold time is measured from the ETP of the second vehicle in relation to the intersection.

26. The first vehicle of claim 17, wherein the processor being configured to control the movement of the first vehicle further comprises the processor being configured to determine whether to stop at the intersection based on the ETA of the first unknown vehicle and the ETP of the first unknown vehicle.

27. The first vehicle of claim 26, wherein the processor is further configured to reevaluate determining to stop at the intersection based on an event after determining to stop at the intersection.

28. The first vehicle of claim 27, wherein the event includes detecting the first unknown vehicle passing the intersection.

29. The first vehicle of claim 27, wherein the event includes detecting the first unknown vehicle.

30. A first vehicle comprising:
- means for receiving an indication from a second vehicle comprising surrounding information indicating that a first unknown vehicle is detected within a detection range of the second vehicle, wherein the first vehicle and the second vehicle are able to communicate wirelessly, and wherein the first unknown vehicle is unable to communicate wirelessly with the first and the second vehicles, wherein:
  - the first vehicle is traveling on a first street that crosses a second street at an intersection,
  - the surrounding information further indicates a direction of the first unknown vehicle and a lane from which the first unknown vehicle is approaching the intersection, and
  - one of:
    - the surrounding information further comprises a location and a speed of the first unknown vehicle and the first vehicle further comprises means for calculating an estimated time of arrival (ETA) and an estimated time of passing (ETP) of the first unknown vehicle based on the location and the speed of the first unknown vehicle and the detection range of the second vehicle, or
    - the surrounding information indicates the ETA and the ETP of the first unknown vehicle; and
- means for controlling movement of the first vehicle based on the indication.

* * * * *